US010239573B2

(12) United States Patent
Tsao

(10) Patent No.: US 10,239,573 B2
(45) Date of Patent: Mar. 26, 2019

(54) LIGHT SENSING ILLUMINATION DEVICE FOR BICYCLE

(71) Applicant: Shun-Li Yang, Xiamen (CN)

(72) Inventor: Jung-Chou Tsao, Changhua County (TW)

(73) Assignee: Shun-Li Yang, Xiamen (CN)

( * ) Notice: Subject to any disclaimer, the term of this patent is extended or adjusted under 35 U.S.C. 154(b) by 0 days.

(21) Appl. No.: 15/670,514

(22) Filed: Aug. 7, 2017

(65) Prior Publication Data

US 2019/0039670 A1    Feb. 7, 2019

(51) Int. Cl.
  *F21V 33/00*  (2006.01)
  *B62J 6/02*  (2006.01)
  *H01H 13/56*  (2006.01)
  *F21S 41/20*  (2018.01)

(52) U.S. Cl.
  CPC .............. *B62J 6/02* (2013.01); *F21S 41/28* (2018.01); *H01H 13/56* (2013.01)

(58) Field of Classification Search
  None
  See application file for complete search history.

(56) References Cited

U.S. PATENT DOCUMENTS

| 5,971,477 A * | 10/1999 | Bell | B62J 1/00 |
| | | | 297/195.1 |
| 2013/0141933 A1* | 6/2013 | Leonardo | B62J 6/02 |
| | | | 362/523 |

FOREIGN PATENT DOCUMENTS

| CN | 201561302 U | * 8/2010 |
| TW | M429057 | 5/2012 |

OTHER PUBLICATIONS

English abstract translation of Taiwan patent M429057.

* cited by examiner

*Primary Examiner* — Vip Patel
(74) *Attorney, Agent, or Firm* — WPAT, PC

(57) ABSTRACT

A light sensing illumination device for bicycle includes a seat, a reflector, and an illumination device. The seat includes a housing space. The reflector is disposed in the seat and in the housing space, and the reflector includes a reflection curved face which is formed in a smooth arc shape with a concave face thereof facing an opening of the housing space. The illumination unit is disposed in the housing space and projects light beam toward the reflection curved face. With a smooth arc shaped reflection curved face, the light beam projected by the illumination unit is completely reflected, so as to improve the light condensing effect and efficiently enhance the overall brightness.

8 Claims, 6 Drawing Sheets

LIGHT SENSING ILLUMINATION DEVICE FOR BICYCLE

BACKGROUND OF THE INVENTION

1. Field of the Invention

The present invention relates to illumination devices, and more particularly, to a light sensing illumination device for bicycle.

2. Description of the Related Art

The installation of an illumination device for bicycle helps ensure the safety of the user during bicycle riding, especially in an environment with insufficient light. The illumination device not only assists in identifying the conditions on road, but also provides a warning function for traffic in opposite direction.

The bicycle illumination device disclosed by Taiwan patent M429057 comprises a seat, a reflector, and an illumination unit. The reflector is provided with a reflection curved face, which includes a plurality of reflection areas, with a step face disposed between each two neighboring reflection area. Therefore, the structure of the reflection areas are provided with designation flexibility and easy to be manufactured. Also, the StVZO TA23 bicycle headlamp regulation is met.

However, due to the step faces disposed between the reflection areas being arranged in parallel to the light beam projected from the illumination unit, the light beam is prevented from being completely reflected. As a result, the light condensing effect provided by the reflection curved face is adversely affected, and the brightness of the reflected light beam is lowered. Therefore, it is desirable to fix the disadvantages of the known reflection curved face for improving the light condensing effect of the reflection curved face and the brightness of the reflected light beam.

SUMMARY OF THE INVENTION

For improving the issues above, a light sensing illumination device for bicycle is disclosed. With a smooth arc shaped reflection curved face, compared with the traditional design, the light beam is completely reflected to the translucent mirror in the embodiment of the present invention. Thus, the light condensing effect is improved, and the overall brightness is enhanced.

To achieve the aforementioned objectives, an embodiment of the present invention provides a light sensing illumination device, comprising:

a seat, including a housing space and disposed on a bicycle;

a reflector disposed in the seat and in the housing space, the reflector including a reflection curved face, the reflection curved face formed in a smooth arc shape with a concave face thereof facing an opening of the housing space; and an illumination unit disposed in the housing space and projecting light beam toward the reflection curved face.

With such configuration, the smooth arc face of the reflection curved face is able to completely reflect the light beam projected by the illumination unit, such that the light condensing effect provided by the reflector is improved.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 6, an embodiment of a light sensing illumination device for bicycle is provided, comprising a seat 10, a reflector 20, an illumination unit 30, and a translucent mirror 40.

Figure 1:
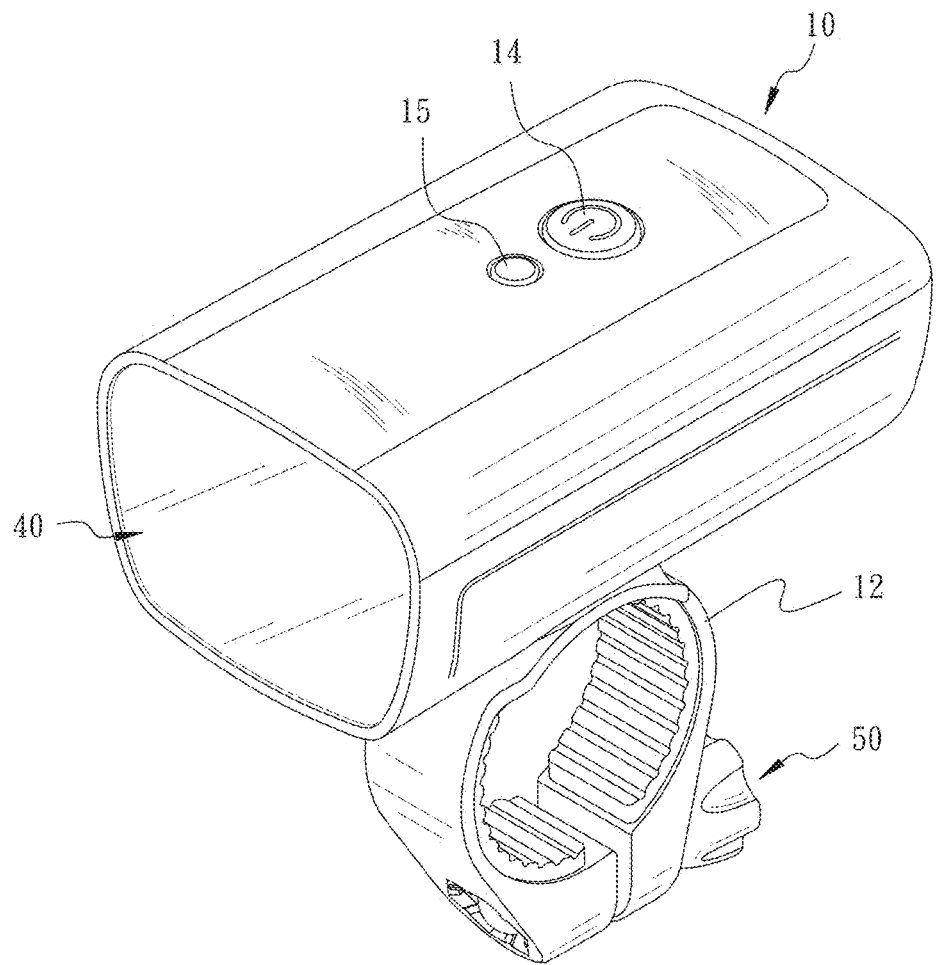
FIG. 1 is a perspective view of an illumination device for bicycle in accordance with an embodiment of the present invention.
Figure 2:
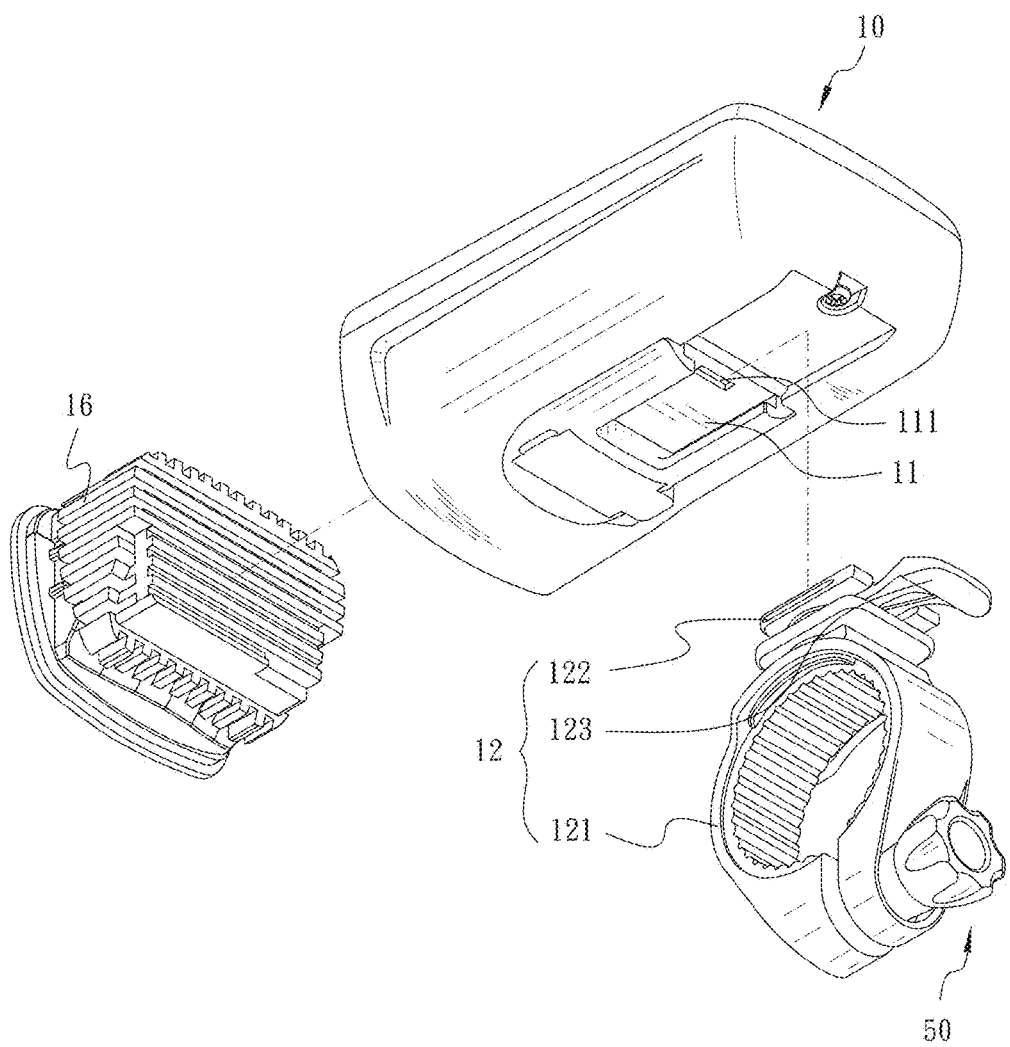
FIG. 2 is an exploded view of the illumination device for bicycle in accordance with the present invention.
Figure 3:
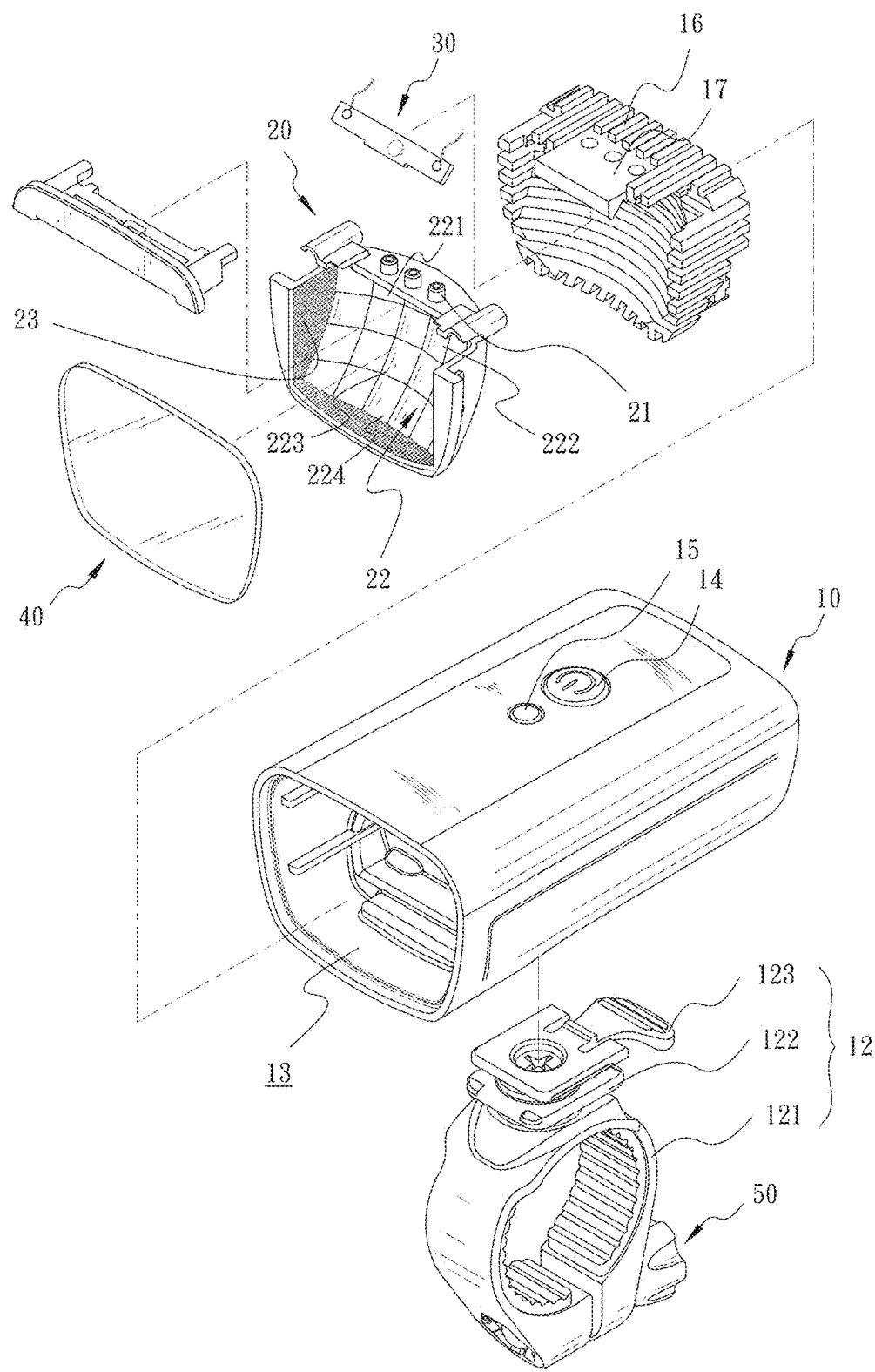
FIG. 3 is a further exploded view of the bicycle illumination device for bicycle taken from another viewpoint.

The seat 10 is formed in a barrel shape and disposed on the bicycle. A rail groove 11 axially extends from the bottom side of the seat 10 toward the front and rear direction of the seat 10. A positioning bore 111 is transversely disposed on an inner side of the rail groove 11. An installation seat 12 is disposed on the bottom side of the seat 10 and provided with an adjustment portion 121, a sliding rail portion 122, and a resilient clamp 123. Referring to FIG. 1 to FIG. 3, the adjustment portion 121 is formed of a C-shaped ring, wherein the sliding rail portion 122 is disposed on the seal end of the adjustment portion 121 for being slidably disposed in the rail groove 11 of the seat 10. A screw member 50 passes through the two ends of the opening of the adjustment portion 121. By adjusting the screw member 50 and shorten the distance between the two ends of the opening of the adjustment portion 121, the adjustment portion 121 is stably mounted on the bicycle. The resilient clamp 123 is made of, in the embodiment, plastic material and disposed on the rear side of the sliding rail portion 122. When the sliding rail portion 122 is slidably disposed in the rail groove 11, the resilient clamp 123 is kept being embedded in the positioning bore 111, such that the seat 10 is prevented from easily detaching from the installation seat 12.

The seat 10 is provided with a housing space 13 for housing the rechargeable battery which provides power to the illumination unit 30. Furthermore, the seat 10 is provided with a power switch 14 and a light sensor 15 disposed on the top thereof, wherein the light sensor 15 is electrically connected with the power switch 14 and the illumination unit 30. The power switch 14 is operated in a pressing manner to optionally switch the light sensor 15 on and off. In an embodiment of the present invention, the power switch 14 is pressed for 10 seconds to switch on the light sensor 15, such that the light sensor 15 senses the brightness of the sunlight, and the brightness of the illumination unit 30 is adjusted correspondingly. For example, when the user is riding the bicycle in the nighttime, if the light sensor 15 does not sense the brightness of the sunlight, the light sensor 15 automatically increases the brightness of the illumination unit 30. When the user is riding the bicycle in the daytime, the light sensor 15 automatically adjusts the brightness of the illumination unit 30 according to the intensity of the sunlight brightness, whereby the serving duration of the battery is increased.

In addition, an arc shaped installation unit 16 is disposed at the opening of the housing space 13, and a positioning plate 17 extends from the top of the installation unit 16 toward the housing space 13, wherein three positioning through holes are transversely arranged on the positioning plate 17.

The reflector 20 is generally formed in an arc shape, and performs in an approximately square shape in the front view thereof. The reflector 20 is disposed in the seat 10 and in the housing space 13. In an embodiment of the present invention, the reflector 20 is received in the installation unit 16. Also, three column shaped positioning blocks 21 are disposed on the top of the reflector 20 for passing through the positioning plate 17 of the installation unit 16.

Figure 4:
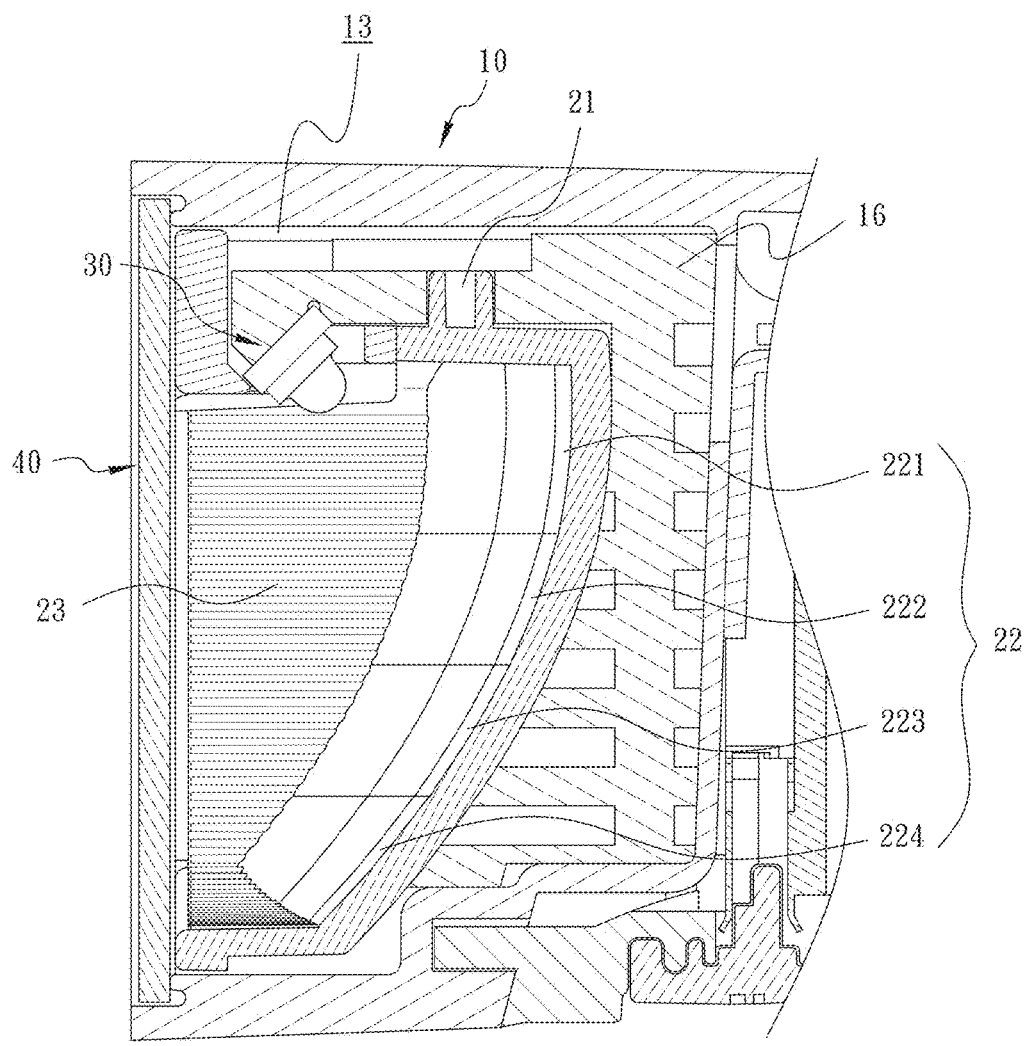
FIG. 4 is a partially sectional view of the illumination device for bicycle.
Figure 5:
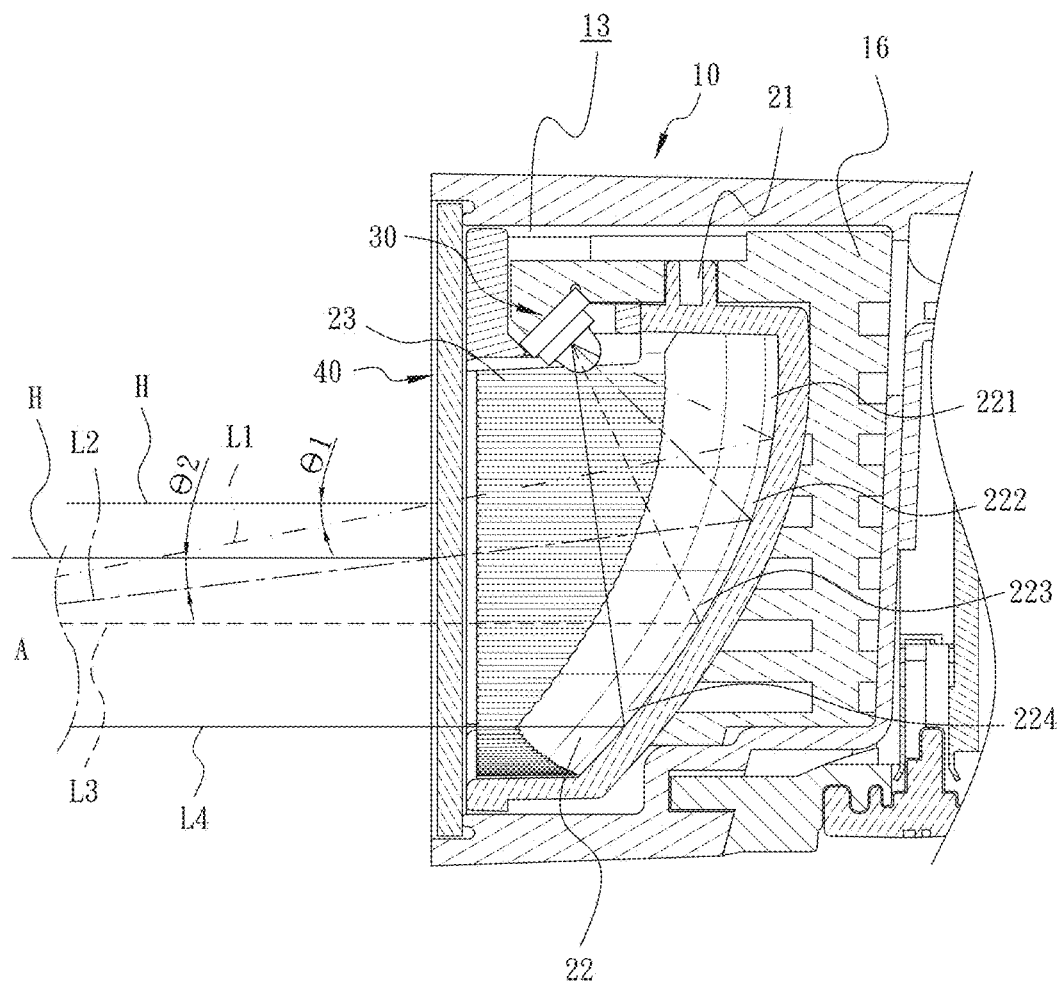
FIG. 5 is a sectional view of the illumination device in the operation status, illustrating the light beam reflection route of each reflection area.

The reflector 20 is provided with a reflection curved face 22 formed in a smooth arc shape, with a concave face thereof facing the opening of the housing space 13, wherein two lateral sides of the reflection curved face 22 are slightly and symmetrically bent toward each other. The reflection curved face 22 includes a plurality of reflection areas. When the reflection areas receive the light beam projected from the illumination unit 30, light reflection routes L1, L2, L3, and L4 are produced and condense the light beam toward a light condensed area A. As shown by FIG. 4 and FIG. 5, the reflection areas include a first reflection area 221, a second reflection area 222, a third reflection area 223, and a fourth reflection area 224. In an embodiment of the present invention, the first reflection area 221 is positioned in adjacent to the top side of the reflection curved face 22, and the fourth reflection area 224 is positioned in adjacent to the bottom side of the reflection curved face 22, with the second reflection area 222 and the third reflection area 223 positioned between the first reflection area 221 and the fourth reflection area 224.

Referring to FIG. 5, in an embodiment of the present invention, the reflection route L4 of the fourth reflection area 224 is approximately parallel to the horizontal line H, and the reflection route L1 of the first reflection area 221 deviates below the horizontal line H. As shown by FIG. 5, the reflection route L1 of the first reflection area 221 and the horizontal line H include an approximate 9 degrees angle θ1; the reflection route L2 of the second reflection area 222 and the horizontal line H include an approximate 1 degree angle θ2; the reflection routes L3, L4 of the third reflection area 223 and the fourth reflection area 224 are approximately parallel to the horizontal line H.

With such configuration, the highest reflection areas, such as the first reflection area 221, reflect the light beam to a relatively closer place, and the lower reflection areas, such as the third reflection area 223 and the fourth reflection area 224, reflect the light beam to a relatively farther place.

Figure 6:
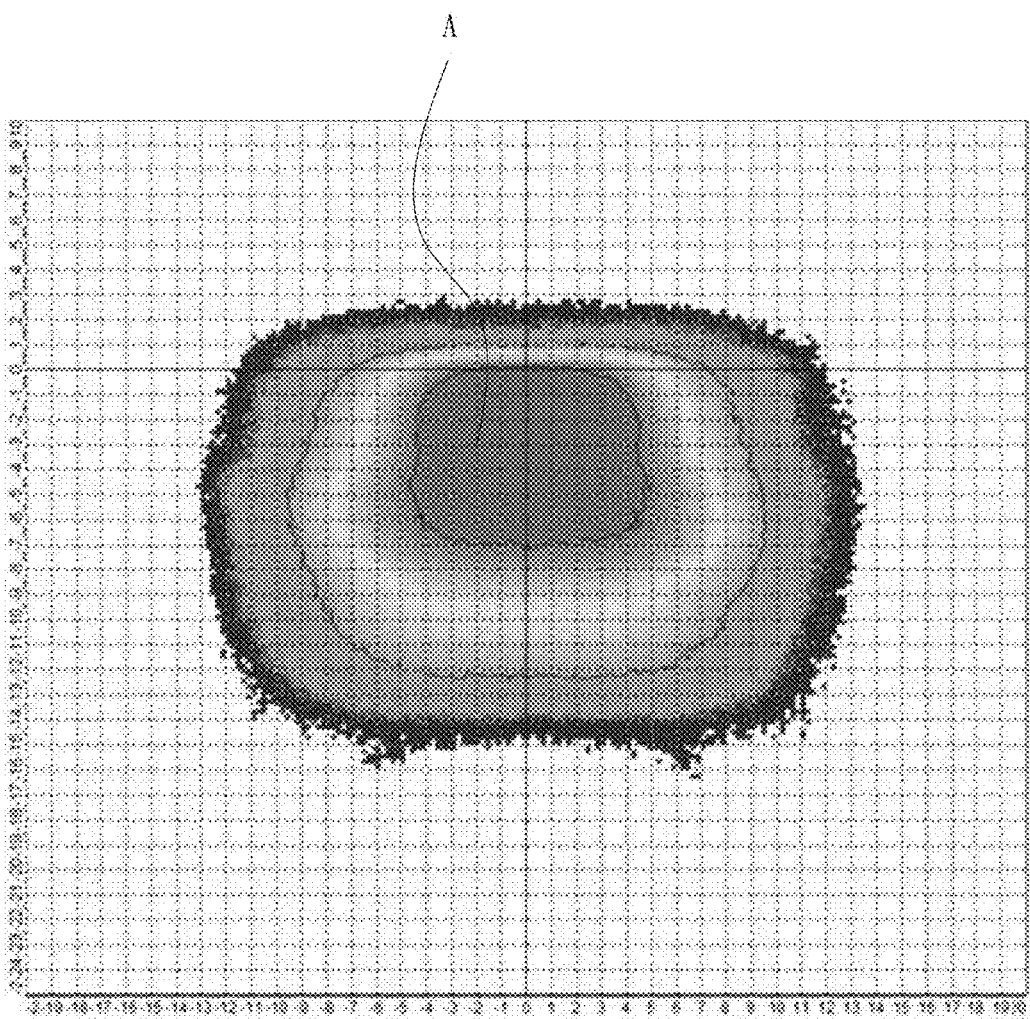
FIG. 6 is an illuminance diagram of the illumination device based on the StVZO TA23 regulation.

Referring to FIG. 5 and FIG. 6, according to the German StVZO TA23 regulation test, range of the light condensed area A is larger and more condensed than the light condensed area of the prior art. Therefore, by use of the light reflection routes L1, L2, L3, and L4 produced by the light beam projected to each reflection areas of the reflection curved face 22 to be refracted, the reflection curved face 22 achieves an improved light condensing ability, thereby enhancing the illumination effect.

Furthermore, the reflector 20 is provided with a reflection plate 23, which extends from the reflection curved face 22 toward the opening of the housing space 13. Also, the surface of the reflection plate 23 is formed in a transversely and continuously arranged wave shape, so as to further scatter the light beam laterally projected from the illumination unit 30. Therefore, the reflection curved face 22 receives a larger amount of light beam, such that the light condensing ability of the reflector 20 is effectively enhanced.

The illumination unit 30, in an embodiment of the present invention, refers to a light emitting diode. Also, the light beam projection of the illumination unit 30 is inclined at 45 degrees below the imaginary horizontal line H, and projects light beam toward the reflection curved face 22 of the reflector 20.

The translucent mirror 40 is disposed in the seat 10 and covers the opening of the housing space 13, such that the translucent mirror 40 and the reflector 20 form a sealed environment. Further, the translucent mirror 40 is allowed to form various refraction areas with different refraction index, so as to define the reflection routes L1, L2, L3, and L4 projected from the reflector 20, thus achieving a desirable light condensing, light scattering, or other light refracting effects.

To sum up, the reflection curved face 22 is formed in a smooth arc shape, so as to completely reflect the light beam projected from the illumination unit 30 to the translucent mirror, thereby efficiently improving the light condensing effect and increasing the overall brightness.

Also, the light sensor 15 adjusts the brightness of the illumination unit 30 according to the brightness of the sunlight, thus increasing the serving duration of the battery.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A light sensing illumination device for bicycle, comprising:
a seat, including a housing space and disposed on a bicycle;
a reflector disposed in the housing space, the reflector including a reflection curved face and reflection plates, wherein the reflection curved face is in a continuous smooth arc shape facing an opening of the housing space, the reflection plates having a continuously arranged wave shape extending from the reflection curved face toward the opening of the housing space, the reflection curved face including a plurality of reflection areas connecting together without height and thickness difference between each two neighboring reflection areas, and the reflection areas including a first reflection area, a second reflection area, a third reflection area, and a fourth reflection area sequentially arranged along a longitudinal cross-sectional direction from a top portion to a bottom portion of the reflection curved face; and
an illumination unit disposed in the housing space and projecting light beam toward the reflection curved face;
wherein the light beam is projected to the reflection areas, the first reflection area provides a first reflection route for reflecting the light beam, the second reflection area provides a second reflection route for reflecting the light beam;
wherein a first angle is between the first reflection route and a horizontal line, a second angle is between the second reflection route and the horizontal line, a ratio between the first angle and the second angle is 9:1; and wherein each of the third reflection area and the fourth reflection area generate a horizontal reflection route respectively, and all the reflection routes project the light beam toward a light condensed area.

2. The illumination device of claim 1, wherein the first angle is a 9 degrees angle and the second angle is a 1 degree angle.

3. The illumination device of claim 2, wherein a light beam projection of the illumination unit is inclined at 45 degrees below the horizontal line.

4. The illumination device of claim 1, wherein the reflection plates are two lateral sides of the reflection curved face are symmetrically bent toward each other.

5. The illumination device of claim 1, wherein the seat further includes an installation seat, and the seat is removably mounted on the bicycle by use of the installation seat.

6. The illumination device of claim 5, wherein a rail groove is disposed on one side of the seat, and the installation seat includes an adjustment portion and a sliding rail portion, the adjustment portion removably mounted on the bicycle, the sliding rail portion disposed on one end of the adjustment portion and slidably disposed in the rail groove.

7. The illumination device of claim 6, wherein the installation seat further includes a resilient clamp disposed on one side of the sliding rail portion, and the rail groove includes a positioning bore, such that the resilient clamp is kept being embedded in the positioning bore.

8. The illumination device of claim 1, wherein the seat includes a power switch and a light sensor, the light sensor electrically connected with the power switch and the illumination unit, the power switch optionally switching the light sensor on and off, the light sensor sensing a brightness of sunlight and correspondingly adjusting a brightness of the illumination unit.

* * * * *